United States Patent
Lee

(10) Patent No.: US 10,401,491 B2
(45) Date of Patent: Sep. 3, 2019

(54) COMPACT MULTI RANGE AUTOMOTIVE RADAR ASSEMBLY WITH END-FIRE ANTENNAS ON BOTH SIDES OF A PRINTED CIRCUIT BOARD

(71) Applicant: Toyota Motor Engineering & Manufacturing North America, Inc., Erlanger, KY (US)

(72) Inventor: Jae Seung Lee, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 416 days.

(21) Appl. No.: 15/351,714

(22) Filed: Nov. 15, 2016

(65) Prior Publication Data

US 2018/0136327 A1    May 17, 2018

(51) Int. Cl.
 *G01S 13/93* (2006.01)
 *G01S 7/03* (2006.01)
 *H01Q 1/32* (2006.01)

(52) U.S. Cl.
 CPC ............ *G01S 13/931* (2013.01); *G01S 7/032* (2013.01); *H01Q 1/3233* (2013.01); *G01S 7/038* (2013.01);
 (Continued)

(58) Field of Classification Search
 None
 See application file for complete search history.

(56) References Cited

U.S. PATENT DOCUMENTS

| 4,298,873 | A | 11/1981 | Roberts |
| 4,414,550 | A | 11/1983 | Tresselt |

(Continued)

FOREIGN PATENT DOCUMENTS

| CN | 104122556 | 10/2014 |
| DE | 102013100554 | 1/2013 |

(Continued)

OTHER PUBLICATIONS

Bernard Schoenlinner; "*Compact Wide Scan-Angle Antennas for Automotive Applications and RF MEMS Switchable Frequency-Selective Surfaces*"; Dissertation submitted in partial fulfillment of the requirement for the degree of Doctor of Philosophy (Electrical Engineering) in The University of Michigan, 2004; (190 pages).

(Continued)

*Primary Examiner* — Vladimir Magloire
*Assistant Examiner* — Donald H B Braswell
(74) *Attorney, Agent, or Firm* — Snell & Wilmer LLP

(57) ABSTRACT

A vehicular radar board includes a PCB having a first surface and a second surface. The first surface of the board includes a plurality of transmitter end-fire antennas and a first plurality of receiver end-fire antennas that are spaced apart by a first gap. The second surface of the board includes a second plurality of receiver end-fire antennas that are spaced apart by a second gap that is greater than the first gap. The board also includes a first RFIC positioned on the first surface and designed to control the plurality of transmitter antennas to transmit radar signals and to receive a first reflected signal of the radar signals from the first plurality of receiver antennas. The board also includes a second RFIC positioned on the second surface and designed to receive a second reflected signal of the radar signals from the second plurality of receiver antennas.

16 Claims, 11 Drawing Sheets

(52) U.S. Cl.
CPC ............... *G01S 2013/9375* (2013.01); *G01S 2013/9378* (2013.01); *G01S 2013/9385* (2013.01)

(56) References Cited

U.S. PATENT DOCUMENTS

| | | | |
|---|---|---|---|
| 5,023,623 A | 6/1991 | Kreinheder et al. | |
| 5,023,624 A | 6/1991 | Heckaman et al. | |
| 5,227,808 A | 7/1993 | Davis | |
| 5,400,042 A | 3/1995 | Tulintseff | |
| 5,486,832 A | 1/1996 | Hulderman | |
| 5,557,291 A | 9/1996 | Chu et al. | |
| 5,767,793 A | 6/1998 | Agravante et al. | |
| 5,872,542 A | 2/1999 | Simons et al. | |
| 5,874,915 A | 2/1999 | Lee et al. | |
| 5,940,011 A | 8/1999 | Agravante et al. | |
| 6,046,703 A | 4/2000 | Wang et al. | |
| 6,061,035 A * | 5/2000 | Kinasewitz | H01Q 3/22 343/700 MS |
| 6,154,176 A | 11/2000 | Fathy et al. | |
| 6,317,094 B1 | 11/2001 | Wu et al. | |
| 6,366,254 B1 | 4/2002 | Sievenpiper et al. | |
| 6,496,151 B1 | 12/2002 | Ferreri et al. | |
| 6,496,155 B1 | 12/2002 | Sievenpiper et al. | |
| 6,549,170 B1 | 4/2003 | Kuo et al. | |
| 6,624,845 B2 | 9/2003 | Loyd et al. | |
| 6,815,739 B2 | 11/2004 | Huff et al. | |
| 6,950,062 B1 | 9/2005 | Mather et al. | |
| 7,109,938 B2 | 9/2006 | Franson et al. | |
| 7,170,446 B1 | 1/2007 | West et al. | |
| 7,268,732 B2 | 9/2007 | Gotzig et al. | |
| 7,411,542 B2 | 8/2008 | O'Boyle | |
| 7,532,170 B1 | 5/2009 | Lee et al. | |
| 7,728,772 B2 | 6/2010 | Mortazawi et al. | |
| 7,742,004 B2 | 6/2010 | Fukushima et al. | |
| 7,821,355 B2 | 10/2010 | Engel et al. | |
| 7,924,226 B2 | 4/2011 | Soler Castany et al. | |
| 8,175,512 B2 | 5/2012 | Cornwell | |
| 8,259,032 B1 | 9/2012 | Buckley | |
| 8,319,678 B2 | 11/2012 | Weiss | |
| 8,405,468 B2 | 3/2013 | Uchaykin | |
| 8,576,111 B2 | 11/2013 | Smith et al. | |
| 8,604,991 B2 | 12/2013 | Nagayama | |
| 8,836,592 B2 | 9/2014 | Paulus et al. | |
| 8,902,117 B2 | 12/2014 | Ohno et al. | |
| 8,912,968 B2 | 12/2014 | Shanna et al. | |
| 8,922,448 B2 | 12/2014 | Wong et al. | |
| 8,952,678 B2 | 2/2015 | Giboney et al. | |
| 9,013,365 B2 | 4/2015 | Lee et al. | |
| 9,065,163 B1 | 6/2015 | Wu et al. | |
| 9,142,889 B2 | 9/2015 | Pazin et al. | |
| 9,214,739 B2 | 12/2015 | Sover et al. | |
| 9,225,058 B2 | 12/2015 | DeVries et al. | |
| 9,337,542 B2 | 5/2016 | Coburn et al. | |
| 9,397,740 B2 | 7/2016 | Maltsev et al. | |
| 10,044,102 B2 * | 8/2018 | Belot | H01Q 1/38 |
| 2003/0112172 A1 * | 6/2003 | Shinoda | G01S 13/4463 342/70 |
| 2005/0225481 A1 | 10/2005 | Bonthron | |
| 2006/0044189 A1 | 3/2006 | Livingston et al. | |
| 2006/0164285 A1 * | 7/2006 | Fleisher | G01S 13/887 342/22 |
| 2008/0258964 A1 * | 10/2008 | Schoeberl | G01S 7/032 342/189 |
| 2012/0007765 A1 * | 1/2012 | Margomenos | G01S 7/032 342/70 |
| 2012/0194377 A1 | 8/2012 | Yukumatsu et al. | |
| 2012/0235881 A1 | 9/2012 | Pan et al. | |
| 2012/0295015 A1 | 11/2012 | Yang | |
| 2013/0076579 A1 | 3/2013 | Zhang et al. | |
| 2013/0201076 A1 | 8/2013 | Vos et al. | |
| 2014/0070994 A1 | 3/2014 | Schmalenberg et al. | |
| 2014/0266902 A1 | 9/2014 | Kamgaing et al. | |
| 2015/0070228 A1 | 3/2015 | Gu et al. | |
| 2015/0130673 A1 | 5/2015 | Ng et al. | |
| 2015/0268336 A1 | 9/2015 | Yukumatsu et al. | |
| 2016/0033638 A1 | 2/2016 | Silc | |
| 2016/0125713 A1 | 5/2016 | Blech et al. | |
| 2018/0076526 A1 * | 3/2018 | Garcia | H01Q 21/28 |

FOREIGN PATENT DOCUMENTS

| | | |
|---|---|---|
| WO | WO 01/52352 | 7/2001 |
| WO | WO 2009/092695 | 3/2009 |
| WO | WO 2012076994 | 6/2012 |
| WO | WO 2014184554 | 11/2014 |

OTHER PUBLICATIONS

Ye et al.; "A Dual-Band Printed End-Fire antenna with DSPSL Feeding" 6 pages; Dec. 17, 2015.

Arnadjikpè "Integrated 60-GHz Antenna on Multilayer Organic Package with Broadside and End-Fire Radiation" *IEEE Transactions on Microwave Theory and Techniques*, vol. 61, No. 1, pp. 303-315; Jan. 2013.

Beer et al.; "Novel Antenna Concept for Compact Millimeter-Wave Automotive Radar Sensors;" *IEEE Antennas and Wireless Propagation Letters*; vol. 8; pp. 771-774; Jul. 7, 2009.

Bisognin et al.; "3D Printed Plastic 60 GHz Lens: Enabling Innovative Millimeter Wave antenna Solution and System;" *2014 IEEE MTT-S International Microwave Symposium (IMS2014)*; 4 pages; Jun. 1, 2014.

Choukiker et al.; "Hybrid Fractal Shape Planar Monopole Antenna Covering Multiband Wireless Communication with MIMO Implementation for Handheld Mobile Devices;" *IEEE Transactions on Antennas and Propagation*; vol. 62; No. 3; pp. 1483-1488; Dec. 17, 2013.

Dhiman et al.; "Effect of DGS Technique in MIMO Antenna;" *International Journal of Current Engineering and Technology*; vol.; No. 5; pp. 3138-3141; Oct. 2015.

Djerafi et al.; "Innovative Multilayered Millimetre-Wave Antennas for Multi-Dimensional Scanning and Very Small Footprint Applications" Mar. 26, 2012.

Jansen et al.; "Antenna Design for 24 GHz and 60 GHz Emerging Microwave Applications;" *Koninklijke Philips Electronics N.V. 2006*; 137 pages; Jul. 2006.

Li et al.; "A Compact Wideband MIMO Antenna with Two Novel Bent Slits;" *IEEE Transactions on Antennas and Propagation*; vol. 60; No. 2; pp. 482-489; Feb. 2012.

Li, Yuan; "Development of Micromachined Millimeter Wave Modules for Wireless Communication Systems;" Georgia Institute of Technology; 128 pages; Aug. 2010.

Litzenberger et al.; "Study of Waveguide Antenna Implemented in Laminated Material" Dec. 2002.

Ranade, et al.; "Design of a Substrate Integrated Waveguide H Plane Horn Antenna on a PTFE Substrate for Automotive Radar Application;" *Applied Electromagnetics Conference (AEMC), 2011 IEEE*; 4 pages; Dec. 18, 2011.

Ramadurgakar, Ameya "X Band Substrate Integrated Horn Array Antenna for Future Advanced Collison Avoidance System" Drexel University; 133 pages; 2011.

Schwering, Felix K.; "Millimeter Wave Antennas;" *Proceedings of the IEEE*; vol. 80; No. 1; pp. 92-102; Jan. 1992.

Shamsinejad et al.; "Microstrip-Fed 3-D Folded Slot Antenna on Cubic Structure;" *IEEE Antennas and Wireless Propagation Letters*; vol. 15; pp. 1081-1084; 2016.

Tahim et al.; "Multi-Band Antenna Technology;" *Antennas and Propagation Society International Symposium, 2004 IEEE*; vol. 4; pp. 3968-3971; Jun. 20, 2004.

Yang; "Dual Band-Notched Ultrawideband MIMO Antenna Array;" *Wireless Symposium (IWS), 2013 IEEE International*; 4 pages; Apr. 18, 2013.

Yuan et al. "Multiband Printed and Double-Sided Dipole Antenna for Wlan/WiMax Applications" Microwave and Optical Technology Letters, vol. 42, No. 4, pp. 1019-1022, Apr. 2012.

Harvey et al. "Spatial Power Combining for High-Power Transmitters" *IEEE Microwave*; pp. 48-59; Dec. 2000.

(56) References Cited

OTHER PUBLICATIONS

Larumbe-Gonzalo et al. "Coherently Fed Frequency Scanning Phased Array Structure for Imaging Applications" IEEE $6^{th}$ European Conference on Antennas and Propagation (EUCAP); pp. 2802-2806; 2011.
Li et al. "Dual-Beam Steering Microstrip Leaky Wave Antenna with Fixed Operating Frequency" *IEEE Transactions on Antennas and Propagation*; vol. 56, No. 1; pp. 248-252; Jan. 2008.

\* cited by examiner

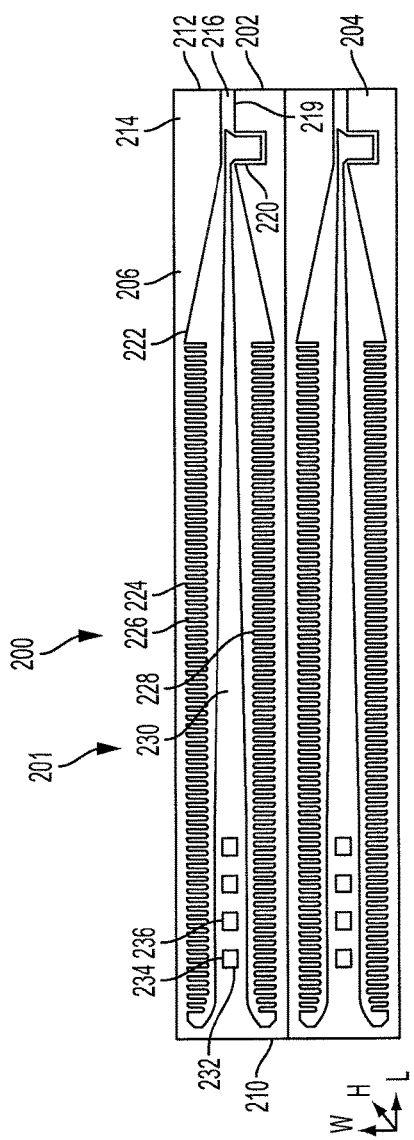
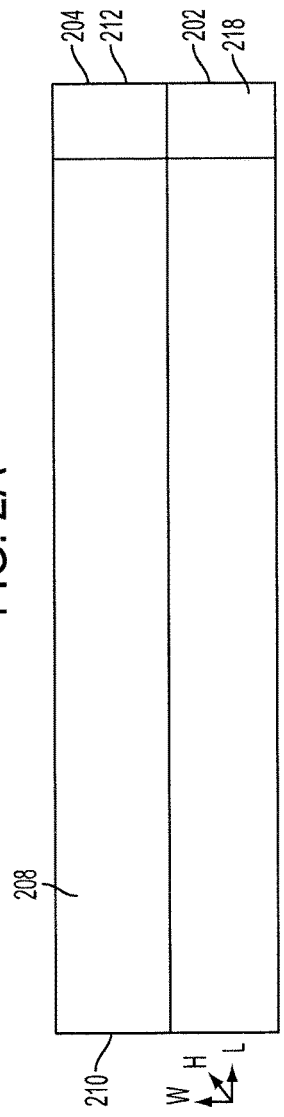
FIG. 2A
FIG. 2B
FIG. 2C

COMPACT MULTI RANGE AUTOMOTIVE RADAR ASSEMBLY WITH END-FIRE ANTENNAS ON BOTH SIDES OF A PRINTED CIRCUIT BOARD

BACKGROUND

1. Field

The present disclosure relates to vehicular radar systems and, in particular, to a vehicular radar system having a long-range antenna array on one side of a printed circuit board (PCB) and a short-range antenna array on the other side of the PCB.

2. Description of the Related Art

Autonomous and semi-autonomous vehicle functions are increasing in use. For example, some vehicle manufacturers are currently designing fully autonomous and semi-autonomous vehicles that can drive themselves from a starting location to a destination location. Some other vehicles include collision avoidance features that may warn a driver and/or control operations of a vehicle when detected data indicates that the vehicle may collide with another object or vehicle. Algorithms for these autonomous and semi-autonomous vehicle features are based on the detection of objects in the vicinity of the vehicle, such as street signs, other vehicles, people, and the like. Many vehicles incorporate radar systems to detect such objects.

Vehicular radar systems that are currently in use include an array of broadside antennas and a radio frequency integrated circuit (RFIC) coupled to the array of antennas. Each of the antennas is spaced apart by a set distance. The range of the radar system, including a distance and field of view, is set by the quantity of antennas in the array and the spacing between the antennas. For example, a radar system having antennas spaced apart by 1 centimeter will have a longer range than a radar system having antennas spaced apart by half a centimeter.

Difficulties arise when designing a vehicular radar system capable of detecting objects at multiple ranges. Because signals from broadside antennas propagate at an orthogonal angle to a plane of the antenna, a casing for the radar system must have an aperture at least as large as the entire antenna array. In order for the vehicular radar system to detect data at multiple ranges, additional antenna arrays must be added to the radar system, resulting in an even larger aperture size. This relatively large aperture size is undesirable.

Thus, there is a need for improved and relatively compact vehicular radar systems capable of detecting objects at multiple ranges.

SUMMARY

Described herein is a vehicular radar board or device. The vehicular radar board includes a printed circuit board (PCB) having a first planar surface and a second planar surface opposite the first planar surface. The vehicular radar board also includes a plurality of transmitter end-fire antennas positioned on the first planar surface of the PCB. The vehicular radar board also includes a first plurality of receiver end-fire antennas positioned on the first planar surface of the PCB and each being spaced apart by a first gap. The vehicular radar board also includes a second plurality of receiver end-fire antennas positioned on the second planar surface of the PCB and each being spaced apart by a second gap that is greater than the first gap. The vehicular radar board also includes a first radio frequency integrated circuit (RFIC) positioned on the first planar surface of the PCB and coupled to the plurality of transmitter end-fire antennas and the first plurality of receiver end-fire antennas. The first RFIC is designed to control the plurality of transmitter end-fire antennas to transmit radar signals and to receive a first reflected signal of the radar signals from the first plurality of receiver end-fire antennas. The vehicular radar board also includes a second RFIC positioned on the second planar surface of the PCB and coupled to the second plurality of receiver end-fire antennas. The second RFIC is designed to receive a second reflected signal of the radar signals from the second plurality of receiver end-fire antennas.

Also described is a vehicular radar system. The vehicular radar system includes a first radar board. The first radar board includes a first printed circuit board (PCB), a plurality of transmitter end-fire antennas positioned on the first PCB, and a first plurality of receiver end-fire antennas positioned on the first PCB and spaced apart by a first gap. The first radar board also includes a first radio frequency integrated circuit (RFIC) positioned on the first PCB and coupled to the plurality of transmitter end-fire antennas and to the first plurality of receiver end-fire antennas. The first RFIC is designed to control the plurality of transmitter end-fire antennas to transmit radar signals, to receive a first reflected signal of the radar signals from the first plurality of receiver end-fire antennas, and to determine whether an object is present in an environment of the vehicular radar system based on the received first reflected signal. The vehicular radar system also includes a second radar board stacked above or below the first radar board. The second radar board includes a second PCB and a second plurality of receiver end-fire antennas positioned on the first PCB and spaced apart by a second gap that is greater than the first gap. The second radar board also includes a second RFIC positioned on the second PCB and coupled to the second plurality of receiver end-fire antennas. The second RFIC is designed to receive a second reflected signal of the radar signals from the second plurality of receiver end-fire antennas and to determine whether the object is present in the environment of the vehicular radar system based on the received second reflected signal.

Also described is a vehicular radar system. The vehicular radar system includes a first vehicular radar board. The first vehicular radar board includes a printed circuit board (PCB) having a first planar surface and a second planar surface opposite the first planar surface. The first vehicular radar board also includes a plurality of transmitter end-fire antennas positioned on the first planar surface of the PCB, a first plurality of receiver end-fire antennas positioned on the first planar surface of the PCB and each being spaced apart by a first gap, and a second plurality of receiver end-fire antennas positioned on the second planar surface of the PCB and each being spaced apart by a second gap that is greater than the first gap. The first vehicular radar board also includes a first radio frequency integrated circuit (RFIC) positioned on the first planar surface of the PCB and coupled to the plurality of transmitter end-fire antennas and to the first plurality of receiver end-fire antennas. The first RFIC is designed to control the plurality of transmitter end-fire antennas to transmit radar signals and to receive a first reflected signal of the radar signals from the first plurality of receiver end-fire antennas that corresponds to an object. The first vehicular radar board also includes a second RFIC positioned on the second planar surface of the PCB and coupled to the second plurality of receiver end-fire antennas. The second RFIC is designed to receive a second reflected signal of the radar signals from the second plurality of receiver end-fire antennas that corresponds to the object. The vehicular radar system also includes a second vehicular radar board stacked above or below the first vehicular radar board and having similar features as the first vehicular radar board. The vehicular radar system also includes an electronic control unit (ECU) coupled to the first vehicular radar board and the second vehicular radar board. The ECU is designed to receive data regarding the object from the first vehicular radar board and the second vehicular radar board and to determine three-dimensional (3D) information regarding the object based on the data received from the first vehicular radar board and the second vehicular radar board.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 2A is a drawing showing a top view of two end-fire antennas of an end-fire antenna array according to an embodiment of the present invention;

FIG. 2B is a drawing showing a bottom view of the end-fire antenna array of FIG. 2A according to an embodiment of the present invention;

FIG. 2C is a drawing showing a side view of the end-fire antenna array of FIG. 2A according to an embodiment of the present invention;

DETAILED DESCRIPTION

The present invention provides vehicular radar boards and systems. An exemplary vehicular radar system may include a two-sided printed circuit board (PCB) having multiple antennas. An array of transmitter antennas, a first array of receiver antennas, and a first radio frequency integrated circuit (RFIC) are positioned on one side of the PCB, and a second array of receiver antennas and a second RFIC are positioned on the other side of the PCB. The first RFIC controls the array of transmitter antennas to transmit a radar beam into the environment. One or both of the arrays of receiver antennas may receive a reflection of the radar beam. The first RFIC receives the reflected beam from the first array of receiver antennas and analyzes the reflected beam to determine characteristics of an object. The second RFIC receives the reflected beam from the second array of receiver antennas and analyzes the reflected beam to determine characteristics of the same object or a different object. The first array of receiver antennas includes fewer antennas than the second array of receiver antennas and each antenna of the first array is spaced apart by a shorter distance than the antennas of the second array. This arrangement results in the second array being capable of receiving data from a longer range and smaller field of view than the first array.

The multiple-range vehicular radar system provides benefits and advantages such as the capability to detect objects within a larger area of the vehicle than a single-range radar system. In particular, the first array of receiver antennas may beneficially detect objects relatively close to the vehicle within a relatively wide angle, and the second array of receiver antennas may beneficially detect objects relatively far away from the vehicle within a relatively narrow angle. The vehicular radar system provides additional benefits such as being relatively compact. The size of the vehicular radar system and the type of antennas used advantageously allows a casing of the system to have a relatively small aperture. Because the antennas are end-fire antennas, a vehicular radar system can include multiple PCBs with multiple short-range and long-range antenna arrays stacked above each other. This provides the advantage of the vehicular radar system being capable of detecting three-dimensional (3D) data corresponding to the environment.

Figure 1:
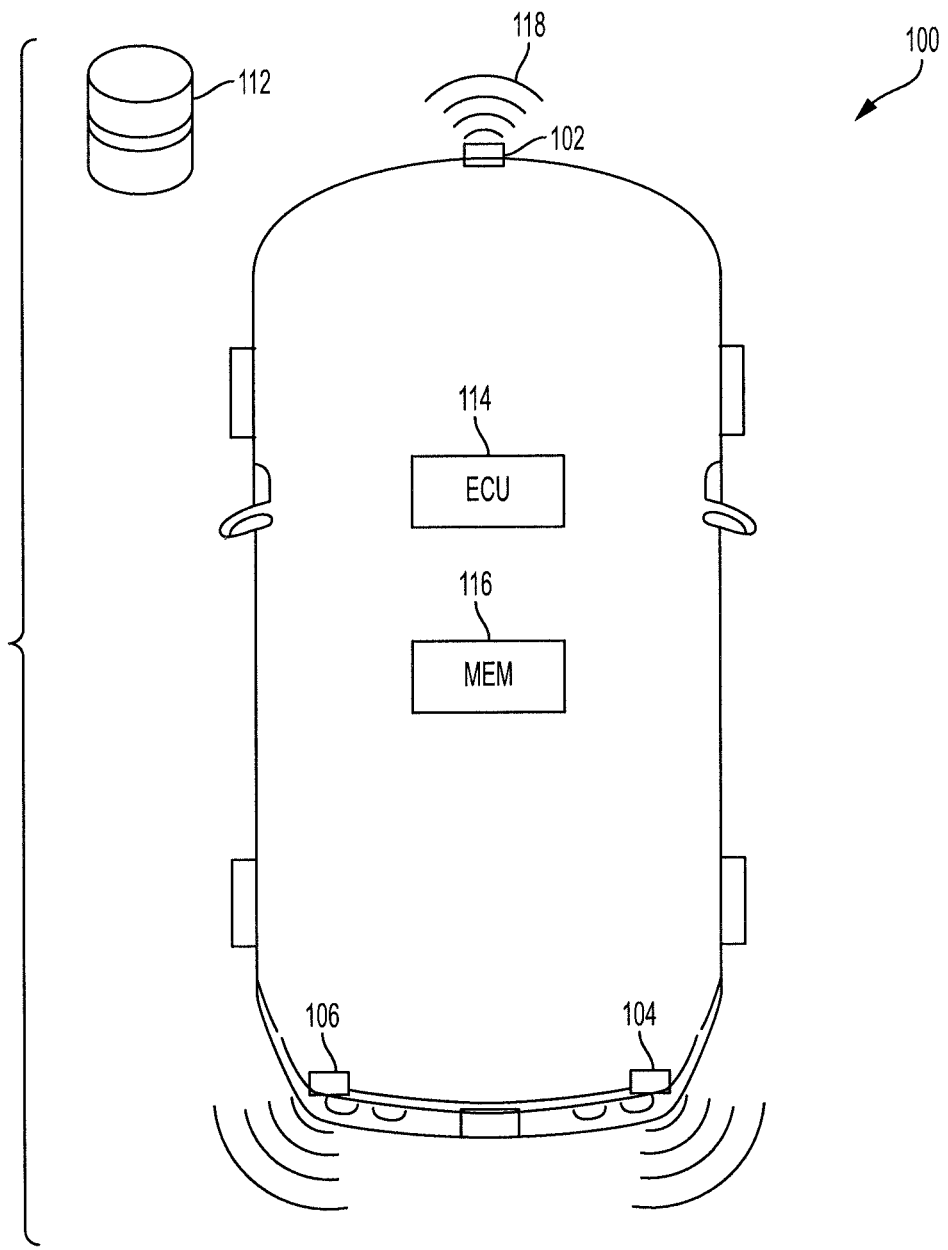
FIG. 1 is a drawing of a vehicle having multiple vehicular radar systems for sensing objects in an environment of the vehicle according to an embodiment of the present invention.

Turning to FIG. 1, a vehicle 100 having radar sensing capabilities is shown. The vehicle 100 includes a first vehicular radar system 102, a second vehicular radar system 104, and a third vehicular radar system 106. Each of the vehicular radar systems 102, 104, 106 may detect data corresponding to characteristics of objects around the vehicle 100 such as a distance to the object, a size of the object, or the like. For example, the vehicular radar system 102 may transmit a signal or a beam 118. The beam 118 may reflect off of an object 112 and propagate back towards the vehicular radar system 102. The vehicular radar system 102 may receive the reflected signal and determine characteristics of the object 112 based on the received reflection of the signal.

It is desirable for the vehicular radar systems 102, 104, 106 to detect objects at multiple ranges. As will be described with greater detail below, the vehicular radar systems 102, 104, 106 have been designed to include multiple antenna arrays, some of which may have a greater quantity of antennas and/or a greater spacing between antennas than others for detecting objects within various ranges.

It is also desirable for each of the vehicular radar systems 102, 104, 106 to detect volumetric, or three-dimensional (3D), data corresponding to objects in the environment. As will also be described with greater detail below, the vehicular radar systems 102, 104, 106 have been designed to have multiple antennas of a particular type positioned adjacent to each other in two directions to provide for volumetric scanning.

The vehicle 100 may also include an electronic control unit (ECU) 114 and a memory 116. In some embodiments, the ECU 114 may include a logic device, such as a processor, a microprocessor, a FPGA, or the like, specifically designed to perform functions that correspond to operations of the vehicle 100. The memory 116 may include any non-transitory memory capable of storing data. For example, the memory 116 may store instructions to be performed by the ECU 114, may store data usable by the ECU 114 to identify characteristics of objects based on radar and/or image data, or the like.

The ECU 114 may be coupled to each of the vehicular radar systems 102, 104, 106. The ECU 114 may receive radar data corresponding to objects in the environment. The ECU 114 may determine the presence of, and characteristics of, an object based on the radar data. For example, the ECU 114 may determine that the object 112 is 5 feet away from the vehicle 100 and has a height of 3 feet based on the radar data.

Turning now to FIGS. 2A, 2B, and 2C, a top view, a bottom view, and a side view, respectively, of an end-fire antenna array 200 are shown. The end-fire antenna array 200 may be included in a vehicular radar system 201. An L-W-H axis is shown in various drawings to illustrate directions corresponding to a length, a width, and a height of the vehicular radar system 201. Although features are described with reference to the length, the width, and the height, one skilled in the art will realize that the vehicular radar system 201 may be oriented in any direction such that, for example, a height may be referred to as a length and so forth.

The end-fire antenna array 200 has a plurality of end-fire antennas including a first end-fire antenna 202 and a second end-fire antenna 204. In some embodiments, the antenna array 200 may include between 2 and 32 end-fire antennas.

The antenna array 200, and thus the first antenna 202 and the second antenna 204, has a top 206 and a bottom 208. The terms top and bottom are used for reference only. One skilled in the art will realize that the top 206 and the bottom 208 of the antenna array 200 may be oriented in any direction.

The first antenna 202 may include a metal 216 inside of or on a PCB 214. The metal 216 may be, for example, a metal trace printed on the PCB 214. The first antenna 202 includes a transmission end 210 and a chip connection end 212. The transmission end 210 is an end of the first antenna 202 from which signals propagate into the atmosphere. The chip connection end 212 is an end of the first antenna 202 from which a signal propagates from an RFIC towards the first antenna 202.

A signal from a controller, such as an RFIC designed to transmit signals in a radio frequency, may be received by the first antenna 202 at the chip connection end 212. The signal may propagate through the first antenna 202 towards the transmission end 210. From the transmission end, the signal may be wirelessly transmitted into the atmosphere in the longitudinal direction (i.e., in the negative L direction).

Similarly, a wireless signal (such as a signal reflected off of an object) may be received by the first antenna 202 at the transmission end 210 and may propagate through the first antenna 202 to the chip connection end 212. The signal may then be received by the controller and analyzed by the controller to determine features of the object from which it was reflected.

The metal 216 of the first antenna 202 may include tin, gold, nickel, any other conductive metal, or any combination thereof. The metal 216 on the bottom 208 of the first antenna 202 may form a ground structure 218. The ground structure 218 may be electrically isolated from the metal 216 on the top 206 of the first antenna 202 and may be connected to an electrical ground. In some embodiments, the first antenna 202 may not include a ground structure, or the ground structure may be positioned elsewhere.

The metal 216 on the top 206 of the first antenna 202 may form an antenna structure including a chip connection lead 219, a balun 220, a tapered section 222, and a wave section 224. In some embodiments, the metal 216 on the top 206 of the first antenna 202 may also form one or more beam adjustment features 232 including a first beam adjustment feature 234 and a second beam adjustment feature 236. The first antenna 202 and the second antenna 204 may each be referred to as tapered slot end-fire antennas.

The chip connection lead 219 may be electronically connected to a controller, such as an RFIC, that controls operation of the antenna array 200.

The balun 220 may function as a transformer and convert an unbalanced signal to a balanced signal and/or may convert a balanced signal to an unbalanced signal.

The tapered section 222 is tapered from the wave section 224 to the balun 220. The converted signal may propagate through the tapered section 222 towards the wave section 224.

The wave section 224 may include a first wave section 226 and a second wave section 228 separated by a space 230. The design of the wave section 224 allows the signal propagating towards the transmission end 210 to continue to propagate beyond the wave section 224 in a wireless manner.

The beam adjustment features 232 may be included or adjusted to alter characteristics of a signal transmitted by the first antenna 202. The beam adjustment features 232 may be positioned within the space 230. The beam adjustment features 232 may have any shape such as the square shape that is shown, a triangular shape, a parallelogram shape, or the like. The beam adjustment features 232 may be electrically isolated from the other metal 216 on the top 206 of the first antenna 202 or may be in electrical contact with the other metal 216.

Figure 2D:
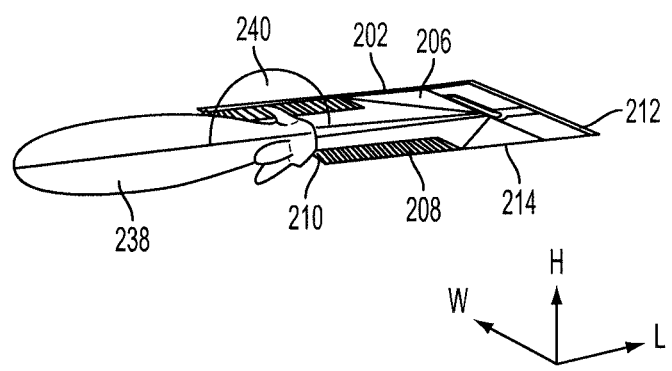
FIG. 2D is a drawing illustrating a shape of a radar beam transmitted by one of the end-fire antennas of FIG. 2A according to an embodiment of the present invention.

Turning to FIG. 2D, the first antenna 202 functions as an end-fire antenna because it transmits a signal or a beam 238 that propagates in a direction parallel to a longitudinal direction of the first antenna 202 (i.e., in the negative L direction). This is distinguished from a signal transmitted by a broadside antenna that propagates perpendicular to a longitudinal direction of an antenna (i.e., in the positive H direction).

Referring to FIGS. 2A and 2D, the beam adjustment features 232 may be varied to adjust characteristics of the beam 238. For example, a quantity of the beam adjustment features 232, a shape of the beam adjustment features 232, and/or dimensions of the beam adjustment features 232 may be selected to achieve desirable characteristics of the beam 238. In some embodiments, the quantity, the shape, and/or the dimensions of the beam adjustment features 232 may be selected in order for the beam 238 to form a desired angle 240 with the top 206 or the bottom 208 of the PCB 214.

Returning reference to FIGS. 2A, 2B, and 2C, bandwidths for automotive or vehicle radar systems may be about 80 gigahertz (GHz), such as between 75-85 GHz and more specifically between 77-79 GHz. Where used in this context, "about" refers to the referenced value plus or minus seven percent (7%). The end-fire antennas provide desirable characteristics at these bandwidths. The end-fire antennas may be positioned adjacent to each other, as shown in FIG. 2A, in order to form a beam that scans in two dimensions. Furthermore, because the signal propagates away from the antenna in the longitudinal direction, the end-fire antennas may be stacked on top of each other, allowing for a volumetric (three-dimensional) scan.

In order to obtain desirable antenna properties of signals having bandwidths in the automotive spectrum, the substrate of the antenna array 200 (i.e., the PCB 214) may be relatively thin. For example, the first antenna 202 (including the PCB 214) may have a height of 0.127 mm in the H direction, a width of 2.5 mm in the W direction, and a length of 10 mm to 30 mm in the L direction.

Figure 3:
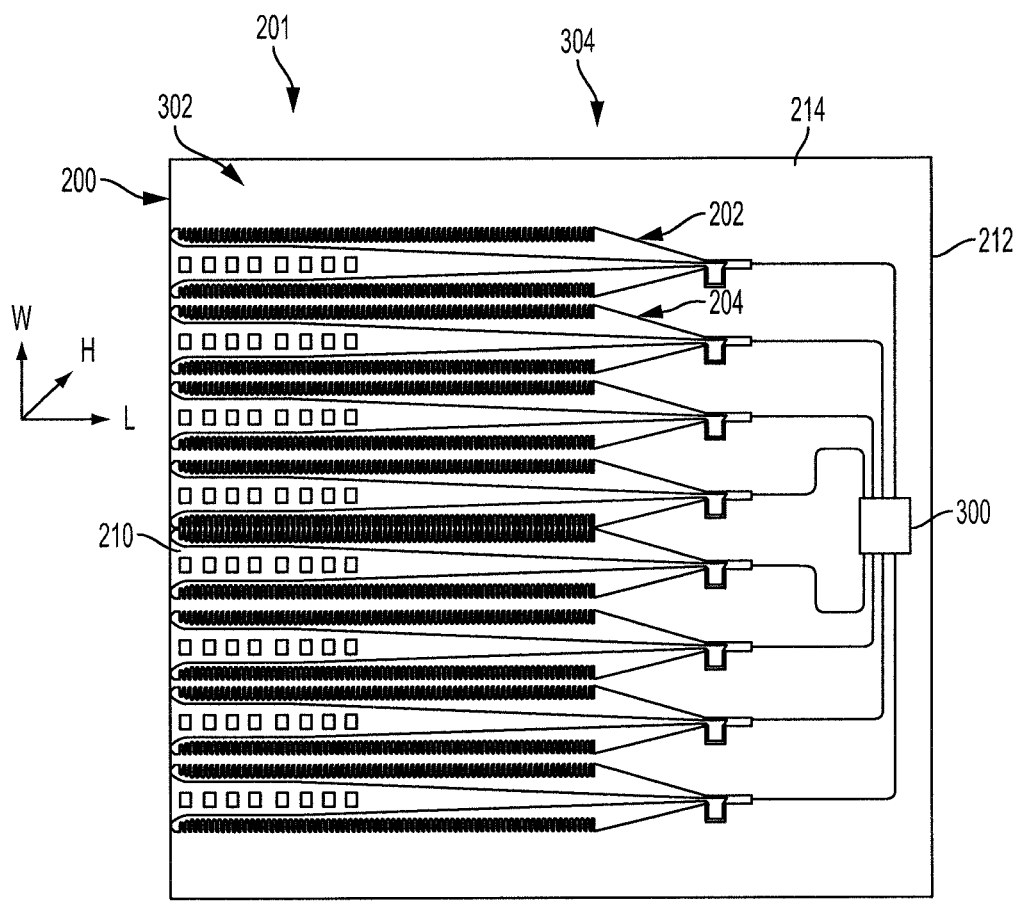
FIG. 3 is a drawing illustrating a radar board having the end-fire antenna array of FIG. 2A and a radio frequency integrated circuit (RFIC) coupled to the end-fire antenna array according to an embodiment of the present invention.

Turning now to FIG. 3, a vehicular radar system 201 may include a vehicular radar board 304. The vehicular radar board 304 may include the end-fire antenna array 200 that includes a plurality of end-fire antennas 302. The vehicular radar board 304 may also include an RFIC 300. The RFIC 300 may be connected to each of the plurality of end-fire antennas 302 of the end-fire antenna array 200. The RFIC 300 may be connected to the PCB 214, and thus the plurality of end-fire antennas 302, in any of a variety of manners such as flip-chip bonding, wire bonding, or the like.

The RFIC 300 may control operation of each of the plurality of end-fire antennas 302. For example, the RFIC 300 may transmit a signal to each antenna of the plurality of end-fire antennas 302, which in turn may be wirelessly transmitted by the corresponding antenna.

The RFIC 300 may control the plurality of end-fire antennas 302 to transmit one or more radar beam. For example, at least some of the signals transmitted by the RFIC 300 to each of the plurality of end-fire antennas 302 may have a different phase. When the signals have a different phase and are transmitted into the atmosphere, the combined signals form a radar beam.

When the beam reaches an object away from the vehicular radar board 304, the beam may reflect from the object and travel towards the vehicular radar board 304. The reflected beam may be received by the end-fire antennas 302 and/or other end-fire antennas and may be transmitted from the antennas to the RFIC 300. In some embodiments, the RFIC 300 may analyze the received beam that was reflected from the object and determine characteristics of the object based on the reflected beam. In some embodiments, the RFIC 300 may relay the received beam to another processing unit, such as the ECU 114 of FIG. 1.

Because the antennas 302 of the vehicular radar board 304 are positioned in a linear manner with respect to each other, the vehicular radar board 304 may scan in two dimensions. When two or more two-dimensional radar boards are stacked such that antennas are positioned in two directions with respect to each other, the radar boards may together scan in three dimensions.

Figure 4:
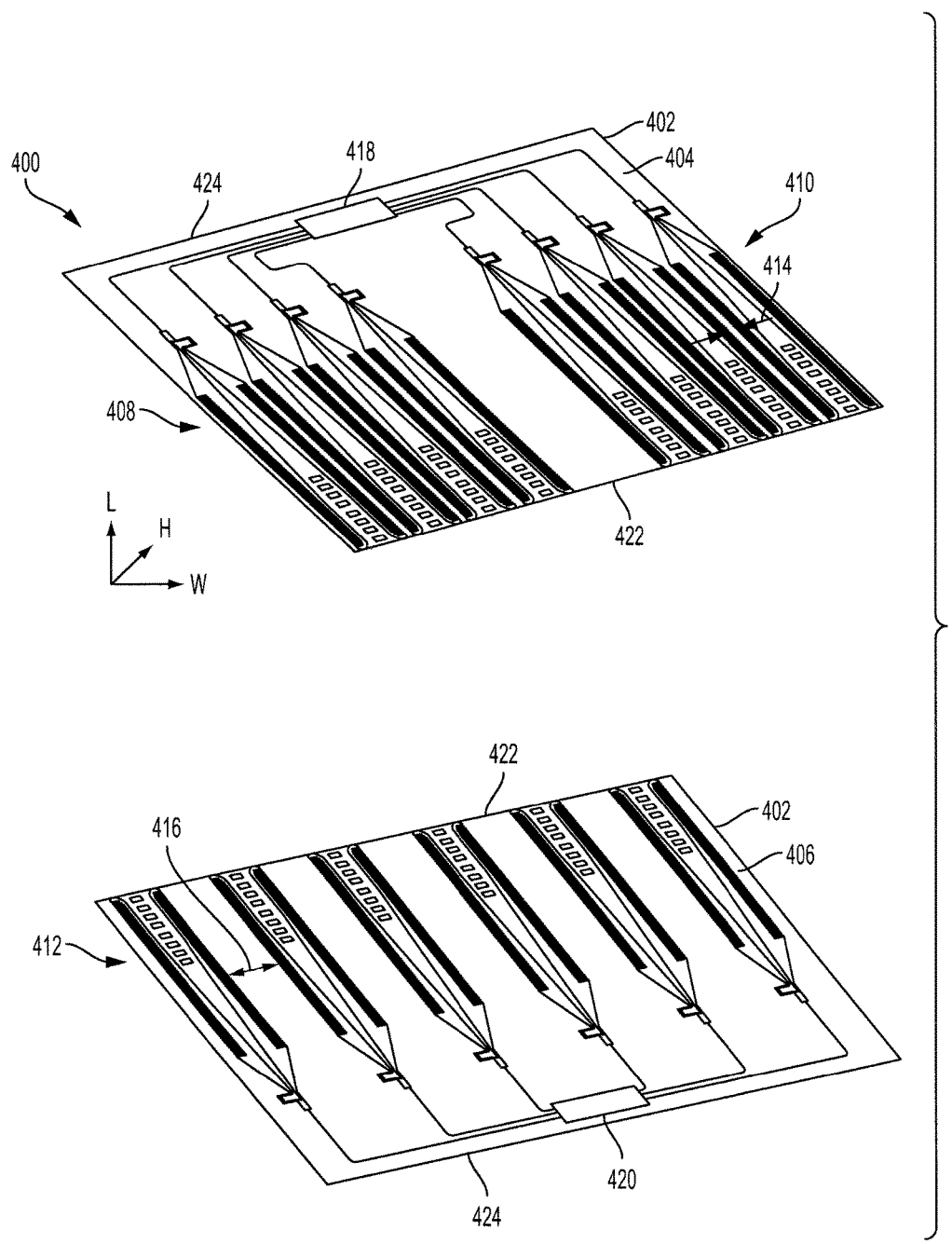
FIG. 4 is a drawing illustrating a vehicular radar board having a transmitter antenna array and a short-range receiver antenna array on a first side of a printed circuit board and a long-range receiver antenna array on a second side of the printed circuit board according to an embodiment of the present invention.

Turning now to FIG. 4, another vehicular radar board 400 is shown. The vehicular radar board 400 includes a PCB 402 having a first planar surface 404 and a second planar surface 406. The second planar surface 406 is on an opposite side of the PCB 402 from the first planar surface 404.

The vehicular radar board 400 includes a plurality of transmitter end-fire antennas 408, a first plurality of receiver end-fire antennas 410, and a second plurality of receiver end-fire antennas 412. The vehicular radar board 400 also includes a first RFIC 418 and a second RFIC 420. The plurality of transmitter end-fire antennas 408, the first plurality of receiver end-fire antennas 410, and the first RFIC 418 are positioned on the first planar surface 404 of the PCB 402. The second plurality of receiver end-fire antennas 412 and the second RFIC 420 are positioned on the second planar surface 406 of the PCB 402.

The plurality of transmitter end-fire antennas 408 and the first plurality of receiver end-fire antennas 410 may be electronically coupled to the first RFIC 418. The first RFIC 418 may control the plurality of transmitter end-fire antennas 408 to transmit a radar beam. The radar beam may propagate into the atmosphere where it may reflect off of objects in the environment. The first plurality of receiver end-fire antennas 410 may receive the reflected radar beam. The first RFIC 418 may receive the reflected radar beam from the first plurality of receiver end-fire antennas 410 and may use the reflected radar beam to determine characteristics of objects in the environment. In that regard, the first RFIC 418 may be designed to both transmit a radar beam and analyze a reflected radar beam.

The second plurality of receiver end-fire antennas 412 may be electronically coupled to the second RFIC 420. The second plurality of receiver end-fire antennas 412 may receive the reflected radar beam from one or more objects. The second RFIC 420 may receive the reflected radar beam from the second plurality of receiver end-fire antennas 412 and may use the reflected radar beam to determine characteristics of the one or more objects. In that regard, the second RFIC 420 may be designed to analyze a reflected radar beam and may not be designed to transmit a radar beam.

In some embodiments, the vehicular radar board 400 may include a second plurality of transmitter end-fire antennas (not shown) positioned on the second planar surface 406. However, because the second plurality of receiver end-fire antennas 412 may receive reflected beams transmitted by the plurality of transmitter end-fire antennas 408, the second plurality of transmitter end-fire antennas is unnecessary.

The vehicular radar board 400 may have a transmission end 422 and a chip connection end 424. The plurality of transmitter end-fire antennas 408 may transmit signals away from the transmission end 422 of the PCB 402. Likewise, the first plurality of receiver end-fire antennas 410 and the second plurality of receiver end-fire antennas 412 may receive signals at the transmission end 422 of the PCB 402.

Each antenna of the first plurality of receiver end-fire antennas 410 may be spaced apart by a first gap 414. Each antenna of the second plurality of receiver end-fire antennas 412 may be spaced apart by a second gap 416. The second gap 416 may be larger than the first gap 414. Furthermore, the first plurality of receiver end-fire antennas 410 may include fewer antennas than the second plurality of receiver end-fire antennas 412. In that regard, the first plurality of receiver end-fire antennas 410 may be designed to detect data at a shorter range than the second plurality of receiver end-fire antennas 412.

Figure 10A:
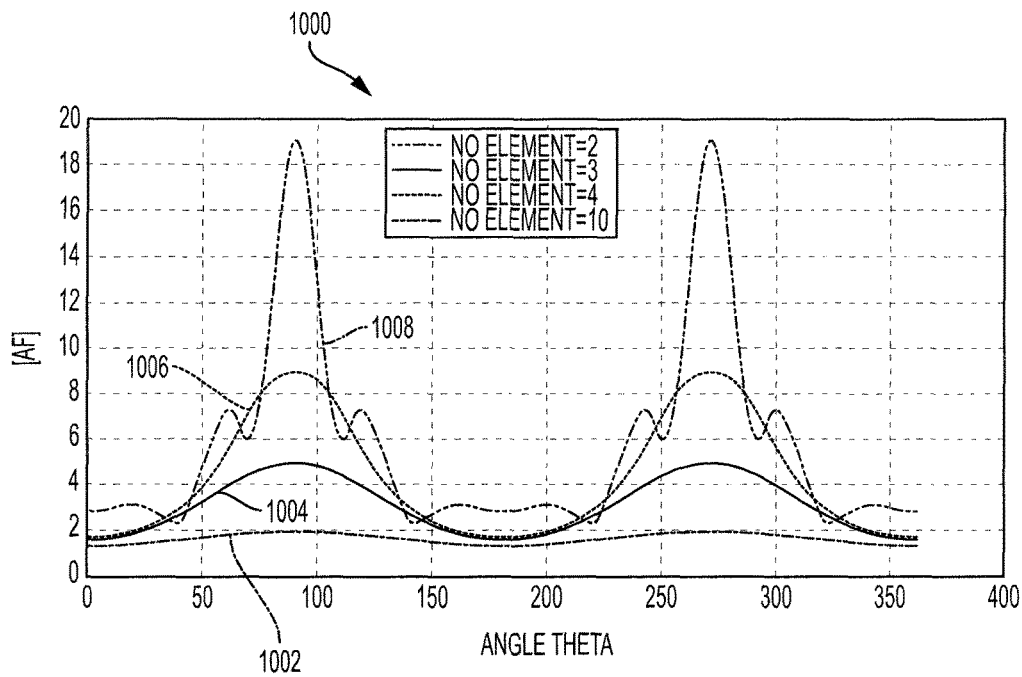
FIG. 10A is a chart illustrating signal intensity and beam width of antenna arrays having various quantities of antennas according to an embodiment of the present invention.
Figure 10B:
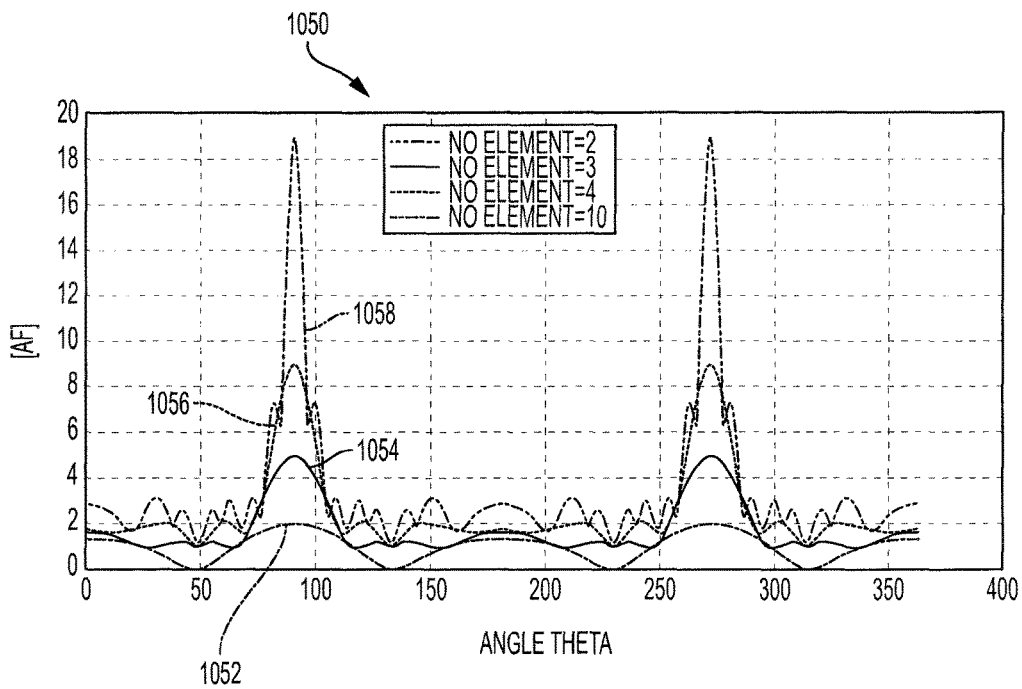
FIG. 10B is a chart illustrating signal intensity and beam width of antenna arrays having various quantities of antennas that are spaced apart by a greater distance than the antenna arrays of FIG. 10A according to an embodiment of the present invention.

Referring briefly to FIGS. 10A and 10B, an array that has greater spacing between antennas may receive a beam that is narrower and has a greater resolution than an array that has less spacing between antennas. Furthermore, an array that has a greater quantity of antennas may receive a beam that is narrower and has a greater resolution and array that has fewer antennas. In particular, FIG. 10A illustrates a beam pattern 1002 for an antenna array having 2 antennas, a beam pattern 1004 for an antenna array having 3 antennas, a beam pattern 1006 for an antenna array having 4 elements, and a beam pattern 1008 for an antenna array having 10 elements. As illustrated in FIG. 10A, the beam intensity increases as the quantity of antennas increases and the beam width decreases as the quantity of antennas increases.

FIG. 10 B illustrates a beam pattern 1052 for an antenna array having 2 elements, a beam pattern 1054 for an antenna array having 3 elements, a beam pattern 1056 for an antenna array having 4 elements, and a beam pattern 1058 for an antenna array having 10 elements. Each of the antennas in the antenna arrays of FIG. 10B are spaced apart by a greater distance than the antennas in the antenna arrays of FIG. 10A. As shown, the increased spacing between antenna elements results in an increase in beam intensity and a decrease in beam width.

Thus, FIGS. 10A and 10B illustrate that antenna arrays with greater spacing between antennas and a greater quantity of antennas results in a relatively narrow beam with relatively better or greater resolution. Accordingly and returning reference to FIG. 4, the second plurality of receiver end-fire antennas 412 may receive beams that are narrower and have a greater resolution than the first plurality of receiver end-fire antennas 410 due to the quantity of antennas and the size of the gap 416.

The second plurality of receiver end-fire antennas 412 may receive reflected radar beams from a greater distance and from a narrower field of view than the first plurality of receiver end-fire antennas 410 due to the resolution and narrowness of the beams. Thus, the first plurality of receiver end-fire antennas 410 may be referred to as a short-range antenna array and the second plurality of receiver end-fire antennas 412 may be referred to as a long-range antenna array.

The second plurality of receiver end-fire antennas 412 has a greater quantity of antennas and a larger gap 416 than the first plurality of receiver end-fire antennas 410. The second plurality of receiver end-fire antennas 412 thus requires more surface area than the first plurality of receiver end-fire antennas 410. Accordingly, the vehicular radar board 400 is designed such that the plurality of transmitter end-fire antennas 408 and the first plurality of receiver end-fire antennas 410 are positioned on the same planar surface of the PCB 402.

The first RFIC 418 and the second RFIC 420 may be coupled to an external processor, such as an ECU or a signal processor. External refers to the fact that the processor may not be positioned on the vehicular radar board 400. The external processor may receive long-range beam information from the second RFIC 420 and may receive short-range beam information from the first RFIC 418. The external processor may then determine characteristics of objects in the environment based on the short-range beam information and the long-range beam information.

Figure 5:
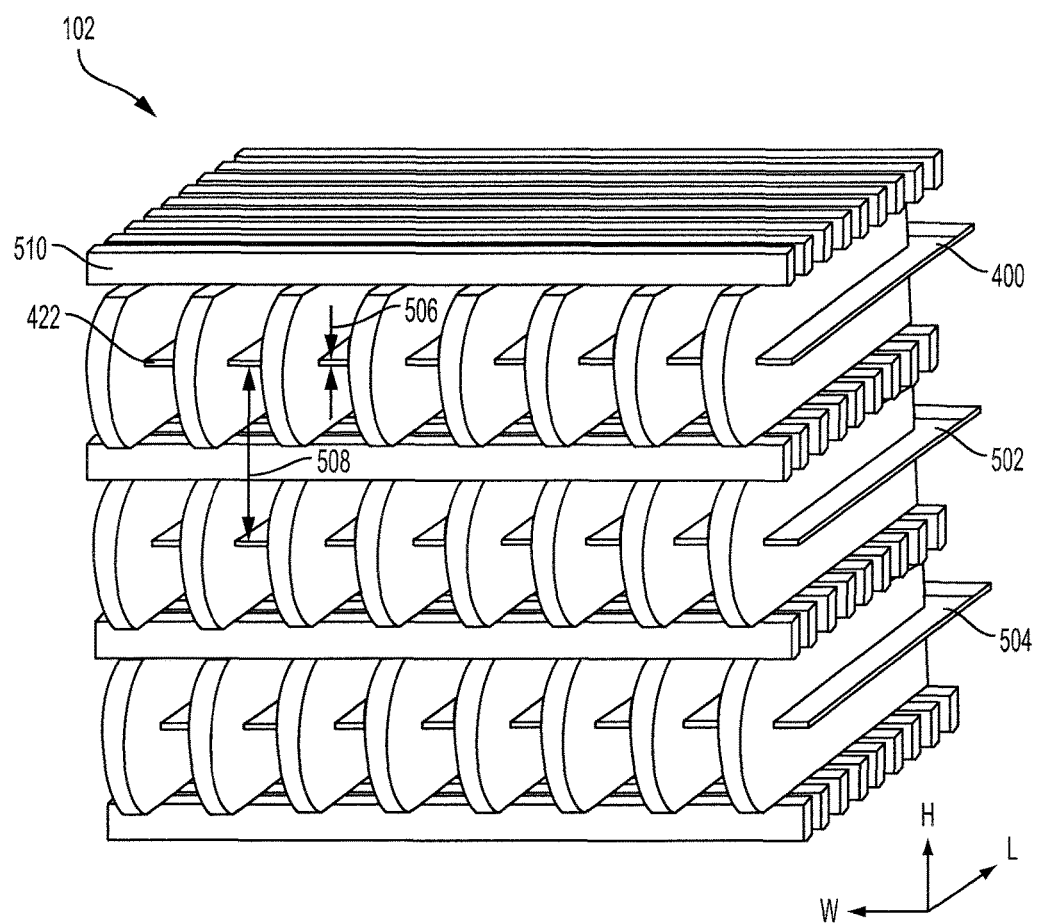
FIG. 5 is a drawing illustrating a vehicular radar system having multiple vehicular radar boards, including the vehicular radar board of FIG. 4, stacked on top of each other for detecting three-dimensional (3D) data according to an embodiment of the present invention.

Turning now to FIG. 5, the vehicular radar system 102 of FIG. 1 is shown. The vehicular radar system 102 includes the vehicular radar board 400 of FIG. 4, a second vehicular radar board 502, and a third vehicular radar board 504. The second vehicular radar board 502 and the third vehicular radar board 504 have similar features as the vehicular radar board 400. In that regard, the second vehicular radar board 502 and the third vehicular radar board 504 may each have a short-range receiver antenna array and a long-range receiver end-fire antenna array. The second vehicular radar board 502 and the third vehicular radar board 504 may or may not each include a transmitter antenna array.

The first vehicular radar board 400, the second vehicular radar board 502, and the third vehicular radar board 504 are stacked above each other along the H axis and are retained in place relative to each other via a casing 510. Because each receiver antenna array of the first vehicular radar board 400, the second vehicular radar board 502, and the third vehicular radar board 504 includes multiple antennas adjacent to each other along the W axis, each receiver antenna array may detect data along the L-W plane. The short-range RFIC and the long-range RFIC of each radar board may be coupled to an external processor. Because each of the radar boards are stacked above each other, the external processor may combine the data from each RFIC and may determine three-dimensional (3D) information corresponding to objects in the environment based on the data from the RFICs. Because the vehicular radar system 102 includes both short-range and long-range antenna arrays, the external processor may determine this three-dimensional (3D) data in a relatively short-range area as well as in a relatively long-range area.

Referring to FIGS. 4 and 5, the PCB 402 may have a thickness 506 along the H direction. It is undesirable for antennas on the first planar surface 404 of the PCB 402 to interfere with signals transmitted or received by antennas on the second planar surface 406. The thickness 506 may be designed to be at least as large as half of the wavelength of signals transmitted by the plurality of transmitter end-fire antennas 408. This reduces the likelihood of such signal interference.

In some embodiments, the PCB 402 may include one or more layers. For example, the PCB 402 may include a first layer that defines the first planar surface 404 and a second layer that defines the second planar surface 406. In some embodiments, the PCB 402 may include additional layers between the first layer and the second layer.

The first vehicular radar board 400 may be separated by the second vehicular radar board 502 by a distance 508 in the H direction. It is undesirable for antennas on the first vehicular radar board 400 to interfere with signals transmitted or received by antennas on the second vehicular radar board 502. The distance 508 may also be set to be at least half of the size of the wavelength of signals transmitted by the plurality of transmitter end-fire antennas 408. This reduces the likelihood of such signal interference.

Figure 6:
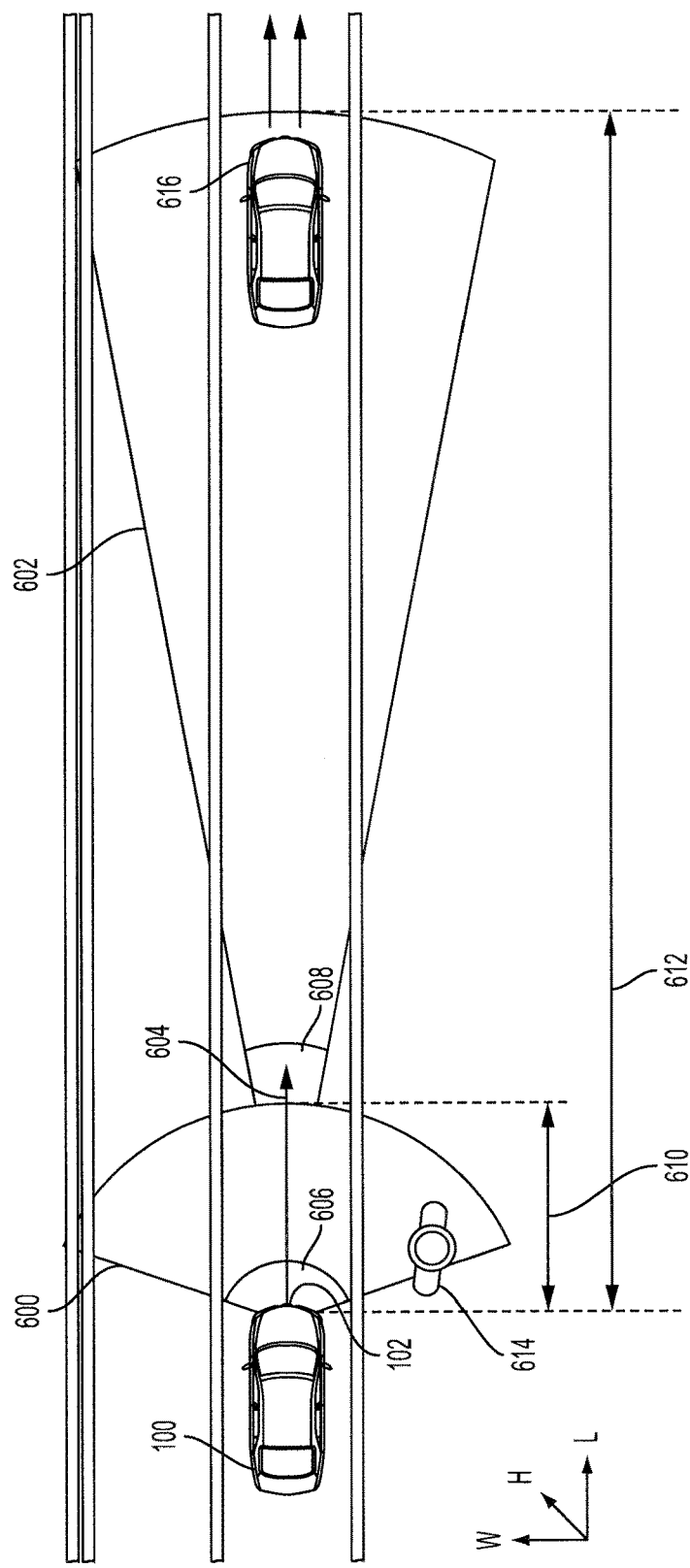
FIG. 6 is a drawing illustrating the ranges of the vehicular radar system of FIG. 5 according to an embodiment of the present invention.

Turning now to FIGS. 4 and 6, an illustration of the short-range 600 (the range of the first plurality of receiver end-fire antennas 410) and the long-range 602 (the range of the second plurality of receiver end-fire antennas 412) of the vehicular radar system 102 is shown. The vehicular radar system 102 is oriented in a forward direction 604. Stated differently, a line from the chip connection end 424 to the transmission end 422 extends along the forward direction 604 such that signals transmitted by the vehicular radar system 102 propagate along the forward direction 604.

The short-range 600 of the vehicular radar system 102 extends for a first distance 610 in the forward direction 604 (i.e., along the L axis) and the long-range 602 of the vehicular radar system 102 extends for a second distance 612 in the forward direction 604. The second distance 612 of the long-range 602 is greater than the first distance 610 of the short-range 600. Furthermore, the short-range 600 of the vehicular radar system 102 extends about the forward direction 604 (i.e., along the L-W plane) at an angle 606, and the long-range 602 of the vehicular radar system 102 extends about the forward direction 604 at an angle 608. The angle 606 of the short-range 600 is greater than the angle 608 of the long-range 602.

The narrower angle 608 and the greater distance 612 of the long-range 602 relative to the short-range 600 is due to the second plurality of receiver end-fire antennas 412 having a greater quantity of antennas and having a larger gap 416 between the antennas than the first plurality of receiver end-fire antennas 410.

FIG. 6 illustrates benefits of the various ranges of the vehicular radar system 102. In particular, the vehicular radar system 102 can detect a pedestrian 614 due to the short-range 600 capabilities and can detect another vehicle 616 due to the long-range 602 capabilities. If the vehicular radar system 102 only included one range, it may be incapable of detecting one or both of the pedestrian 614 and the vehicle 616.

Figure 7:
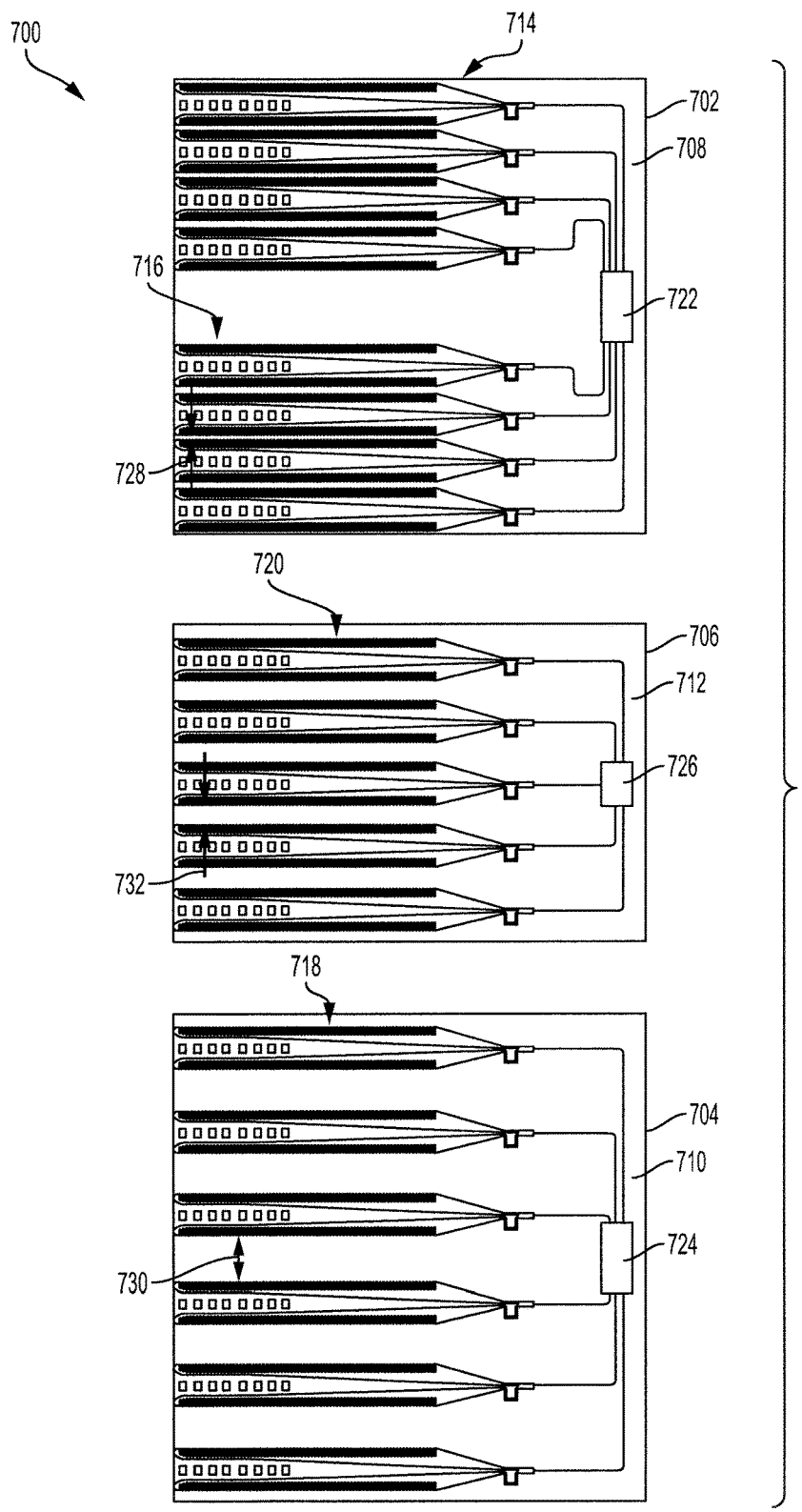
FIG. 7 is a drawing illustrating a vehicular radar system having a first vehicular radar board with a transmitter antenna array and a short-range receiver antenna array, a second vehicular radar board with a long-range receiver antenna array, and a third vehicular radar board with a medium-range receiver antenna array according to an embodiment of the present invention.

Turning now to FIG. 7, another vehicular radar system 700 is shown. The vehicular radar system 700 includes a first vehicular radar board 702, a second vehicular radar board 704, and a third vehicular radar board 706. The first vehicular radar board 702 includes a plurality of transmitter end-fire antennas 714 and a first plurality of receiver end-fire antennas 716 positioned on a first PCB 708. The first vehicular radar board 702 further includes a first RFIC 722 coupled to the plurality of transmitter end-fire antennas 714 and the first plurality of receiver end-fire antennas 716. The second vehicular radar board 704 includes a second plurality of receiver end-fire antennas 718 positioned on a second PCB 710 and a second RFIC 724 coupled to the second plurality of receiver end-fire antennas 718. The third vehicular radar board 706 includes a third plurality of receiver end-fire antennas 720 positioned on a third PCB 712 and a third RFIC 726 coupled to the third plurality of receiver end-fire antennas 720.

Each of the vehicular radar boards 702, 704, 706 includes antennas positioned only on one planar surface of the corresponding PCB 708, 710, 712.

The first RFIC 722 is designed to control the plurality of transmitter end-fire antennas 714 to transmit a radar beam. The first RFIC 722 is further designed to receive a reflection of the radar beam from the first plurality of receiver end-fire antennas 716. The second RFIC 724 is designed to receive a reflection of the radar beam from the second plurality of receiver end-fire antennas 718. The third RFIC 726 is designed to receive a reflection of the radar beam from the third plurality of receiver end-fire antennas 720.

The first plurality of receiver end-fire antennas 716 is designed to receive reflected radar beams within a first range, the second plurality of receiver end-fire antennas 718 is designed to receive reflected radar beams within a second range, and the third plurality of receiver end-fire antennas 720 is designed to receive reflected radar beam within a third range. In order to achieve the various ranges, each of the pluralities of receiver end-fire antennas may have a different quantity of antennas and a different sized gap between the antennas.

In particular, the first plurality of receiver end-fire antennas 716 includes 4 antennas that are each spaced apart by a first gap 728. The second plurality of receiver end-fire antennas 718 includes 6 antennas that are each spaced apart by a second gap 730. The third plurality of receiver end-fire antennas 720 includes 5 antennas that are each spaced apart by a third gap 732.

The first plurality of receiver end-fire antennas 716 includes fewer antennas and has a smaller gap 728 than the second plurality of receiver end-fire antennas 718 and the third plurality of receiver end-fire antennas 720. Thus, the first plurality of receiver end-fire antennas 716 may receive reflected radar beams within a shorter range and a larger field of view than the other 2 pluralities of receiver end-fire antennas.

The second plurality of receiver end-fire antennas 718 includes a greater quantity of antennas and has a larger gap 730 than the first plurality of receiver end-fire antennas 716 and the second plurality of receiver end-fire antennas 718. Thus, the second plurality of receiver end-fire antennas 718 may receive reflected radar beams within a greater range and smaller field of view than the other 2 pluralities of receiver end-fire antennas.

The third plurality of receiver end-fire antennas 720 includes a greater quantity of antennas than the first plurality of receiver end-fire antennas 716 and fewer antennas than the second plurality of receiver end-fire antennas 718. Furthermore, the third plurality of receiver end-fire antennas 720 has a larger gap 732 than the first plurality of receiver end-fire antennas 716 and a smaller gap 732 than the second plurality of receiver end-fire antennas 718. Thus, the third plurality of receiver end-fire antennas 720 may receive reflected radar beams within a range and a field of view that is between the other 2 pluralities of receiver end-fire antennas.

Figure 8:
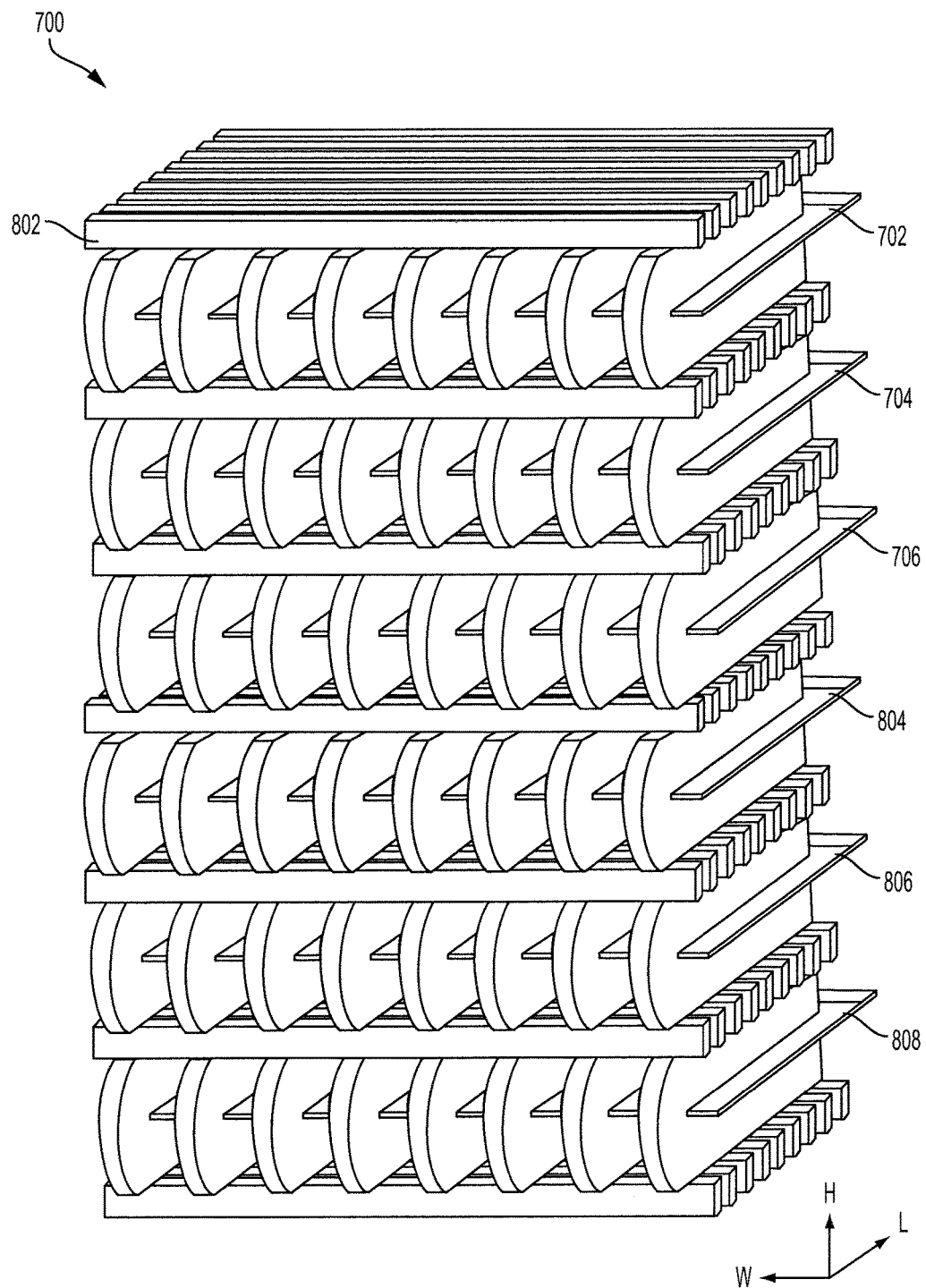
FIG. 8 is a drawing illustrating the vehicular radar system of FIG. 7 including 3 additional vehicular radar boards for detecting three-dimensional (3D) data according to an embodiment of the present invention.

Referring now to FIGS. 7 and 8, the vehicular radar system 700 includes additional vehicular radar boards including a fourth vehicular radar board 804, a fifth vehicular radar board 806 and a sixth vehicular radar board 808. The fourth vehicular radar board 804 includes similar features as the first vehicular radar board 702. The fifth vehicular radar board 806 includes similar features as the second vehicular radar board 704. The sixth vehicular radar board 808 includes similar features as the third vehicular radar board 706. Each of the vehicular radar boards may be stacked along the H axis and retained in place relative to each other via a casing 802.

Each of the vehicular radar boards may detect two-dimensional data regarding objects in the environment. Furthermore, the vehicular radar system 700 includes 2 short-range antenna arrays, 2 medium-range antenna arrays, and 2 long-range antenna arrays stacked along the H direction. Thus, the data from each of the antenna arrays may be combined such that the combined data may be used to determine three-dimensional (3D) data regarding objects in the environment.

Figure 9:
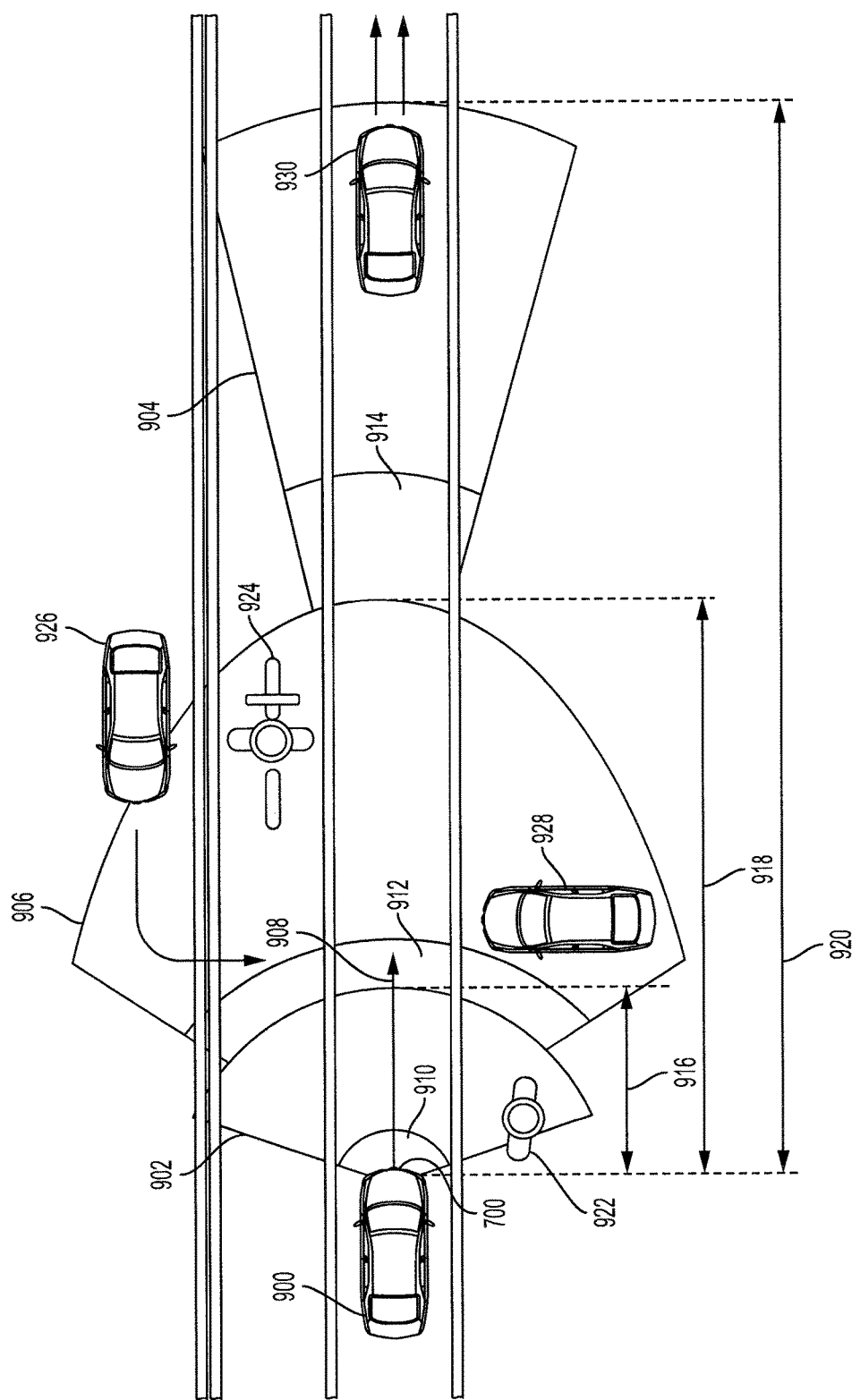
FIG. 9 is a drawing illustrating the ranges of the vehicular radar system of FIG. 8 according to an embodiment of the present invention.

Referring now to FIGS. 7 and 9, an exemplary use of the vehicular radar system 700 by a vehicle 900 is shown. As shown, the vehicular radar system 700 can detect objects within a first range 902 (by the first plurality of receiver end-fire antennas 716), within a second range 904 (by the second plurality of receiver end-fire antennas 718), and within a third range 906 (by the third plurality of receiver end-fire antennas 720). The vehicular radar system 700 may have a forward direction 908.

The first range 902 may have a greater field of view 910 and a shorter distance 916 than the other ranges 904, 906. The second range 904 may have a smaller field of view 914 and a greater distance 920 than the other two ranges 902, 906. The third range 906 may have a field of view 912 and a distance 918 that are each between those of the other two ranges 902, 906.

Various objects may be detectable in one or two ranges but undetectable in the other ranges. For example, a pedestrian 922 may be detected in the first range 902 (such as by the first plurality of receiver end-fire antennas 716) and be outside of the other two ranges 904, 906. Similarly, a vehicle 930 may be detected in the second range 904 (such as by the second plurality of receiver end-fire antennas 718) and be outside of the other 2 ranges 902, 906. Likewise, a bicycle 924, a vehicle 926, and a vehicle 928 may be detected in the third range 906 (such as by the third plurality of receiver end-fire antennas 720) and be outside of the other 2 ranges 902, 904.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicular radar board comprising:
   a printed circuit board (PCB) having a first planar surface and a second planar surface opposite the first planar surface;
   a plurality of transmitter end-fire antennas positioned on the first planar surface of the PCB;
   a first plurality of receiver end-fire antennas positioned on the first planar surface of the PCB and each being spaced apart by a first gap;
   a second plurality of receiver end-fire antennas positioned on the second planar surface of the PCB and each being spaced apart by a second gap that is greater than the first gap, the plurality of transmitter end-fire antennas, the first plurality of receiver end-fire antennas, and the second plurality of receiver end-fire antennas each having a transmission end that is oriented in a single direction;
   a first radio frequency integrated circuit (RFIC) positioned on the first planar surface of the PCB, coupled to the plurality of transmitter end-fire antennas and the first plurality of receiver end-fire antennas, and configured to control the plurality of transmitter end-fire antennas to transmit radar signals, to receive a first reflected signal of the radar signals from the first plurality of receiver end-fire antennas, and to determine whether an object is present within a first angle about the single direction based on the first reflected signal received from the first plurality of receiver end-fire antennas; and
   a second RFIC positioned on the second planar surface of the PCB, coupled to the second plurality of receiver end-fire antennas, and configured to receive a second reflected signal of the radar signals from the second plurality of receiver end-fire antennas and to determine whether the object is present within a second angle about the single direction based on the second reflected signal received from the second plurality of receiver end-fire antennas, the second angle being less than the first angle.

2. The vehicular radar board of claim 1 wherein the first RFIC is further configured to determine whether an object is present within a first distance of the vehicular radar board based on the first reflected signal received from the first plurality of receiver end-fire antennas, and the second RFIC is further configured to determine whether the object is present within a second distance of the vehicular radar board based on the second reflected signal received from the second plurality of receiver end-fire antennas, the second distance being greater than the first distance.

3. The vehicular radar board of claim 1 wherein each antenna of the plurality of transmitter end-fire antennas, the first plurality of receiver end-fire antennas, and the second plurality of receiver end-fire antennas has a chip connection end and includes:
   a chip connection lead positioned adjacent to the chip connection end of each antenna and electrically coupled to a corresponding RFIC;
   a balun positioned adjacent to the chip connection lead of each antenna and configured to convert an unbalanced signal to a balanced signal or to convert a balanced signal to an unbalanced signal;
   a wave section having a first wave section and a second wave section separated by a space and configured to transmit a wireless radar signal; and
   a tapered section positioned between the balun and the wave section of each antenna and tapered towards the balun from the wave section.

4. The vehicular radar board of claim 1 wherein the second plurality of receiver end-fire antennas includes a greater quantity of end-fire antennas than the first plurality of receiver end-fire antennas such that the second plurality of receiver end-fire antennas has a greater resolution than the first plurality of receiver end-fire antennas.

5. The vehicular radar board of claim 1 wherein the radar signals transmitted by the plurality of transmitter end-fire antennas have a wavelength and wherein a thickness of the PCB from the first planar surface to the second planar surface is greater than or equal to an amount that is half of the wavelength.

6. The vehicular radar board of claim 1 further comprising a second plurality of transmitter end-fire antennas positioned on the second planar surface of the PCB and wherein the second RFIC is also coupled to the second plurality of transmitter end-fire antennas and further configured to control the second plurality of transmitter end-fire antennas to transmit second radar signals and to also receive a reflected signal of the second radar signals from the second plurality of receiver end-fire antennas.

7. A vehicular radar system comprising:
   a first radar board having:
      a first printed circuit board (PCB),
      a plurality of transmitter end-fire antennas positioned on the first PCB,
      a first plurality of receiver end-fire antennas positioned on the first PCB and each being spaced apart by a first gap, and
      a first radio frequency integrated circuit (RFIC) positioned on the first PCB, coupled to the plurality of transmitter end-fire antennas and the first plurality of receiver end-fire antennas, and configured to control the plurality of transmitter end-fire antennas to transmit radar signals, to receive a first reflected signal of the radar signals from the first plurality of receiver end-fire antennas, and to determine whether an object is present in an environment of the vehicular radar system based on the received first reflected signal and to determine whether the object is present within a first distance of the vehicular radar system based on the first reflected signal received from the first plurality of receiver end-fire antennas;

a second radar board stacked above or below the first radar board and having:
a second PCB,
a second plurality of receiver end-fire antennas positioned on the first PCB and each being spaced apart by a second gap that is greater than the first gap, and
a second RFIC positioned on the second PCB, coupled to the second plurality of receiver end-fire antennas, and configured to receive a second reflected signal of the radar signals from the second plurality of receiver end-fire antennas and to determine whether the object is present in the environment of the vehicular radar system based on the received second reflected signal and to determine whether the object is present within a second distance of the vehicular radar system based on the second reflected signal received from the second plurality of receiver end-fire antennas; and a third radar board stacked above or below at least one of the first radar board or the second radar board and having:
a third PCB,
a third plurality of receiver end-fire antennas positioned on the third PCB and each being spaced apart by a third gap that is greater than the first gap and less than the second gap, and
a third RFIC positioned on the third PCB, coupled to the third plurality of receiver end-fire antennas, and configured to receive a third reflected signal of the radar signals from the third plurality of receiver end-fire antennas and to determine whether the object is present within a third distance of the vehicular radar system based on the received third reflected signal, the third distance being greater than the first distance and less than the second distance.

8. The vehicular radar system of claim 7 wherein:
the plurality of transmitter end-fire antennas, the first plurality of receiver end-fire antennas, and the second plurality of receiver end-fire antennas each have a transmission end that is oriented in a single direction;
the first RFIC is further configured to determine whether the object is present within a first angle about the single direction based on the first reflected signal received from the first plurality of receiver end-fire antennas; and
the second RFIC is further configured to determine whether the object is present within a second angle about the single direction based on the second reflected signal received from the second plurality of receiver end-fire antennas, the second angle being less than the first angle.

9. The vehicular radar system of claim 7 wherein each antenna of the plurality of transmitter end-fire antennas, the first plurality of receiver end-fire antennas, and the second plurality of receiver end-fire antennas has a chip connection end and a transmission end and includes:

a chip connection lead positioned adjacent to the chip connection end of each antenna and electrically coupled to a corresponding RFIC;
a balun positioned adjacent to the chip connection lead of each antenna and configured to convert an unbalanced signal to a balanced signal or to convert a balanced signal to an unbalanced signal;
a wave section having a first wave section and a second wave section separated by a space and configured to transmit a wireless radar signal; and
a tapered section positioned between the balun and the wave section of each antenna and tapered towards the balun from the wave section.

10. The vehicular radar system of claim 7 wherein the second plurality of receiver end-fire antennas includes a greater quantity of end-fire antennas than the first plurality of receiver end-fire antennas such that the second plurality of receiver end-fire antennas has a greater resolution than the first plurality of receiver end-fire antennas.

11. The vehicular radar system of claim 7 wherein the radar signals transmitted by the plurality of transmitter end-fire antennas have a wavelength and wherein the first PCB and the second PCB are separated by an amount that is at least half of the wavelength.

12. The vehicular radar system of claim 7 wherein the second radar board further includes a second plurality of transmitter end-fire antennas positioned on the second PCB and wherein the second RFIC is also coupled to the second plurality of transmitter end-fire antennas and further configured to control the second plurality of transmitter end-fire antennas to transmit second radar signals and to also receive a reflected signal of the second radar signals from the second plurality of receiver end-fire antennas.

13. The vehicular radar system of claim 7 further comprising:
a fourth radar board stacked above or below at least one of the first radar board, the second radar board, or the third radar board and having:
a fourth PCB,
a fourth plurality of receiver end-fire antennas positioned on the fourth PCB and each being spaced apart by a fourth gap that is equal to the second gap, and
a fourth RFIC positioned on the fourth PCB, coupled to the fourth plurality of receiver end-fire antennas, and configured to receive a fourth reflected signal of the radar signals from the fourth plurality of receiver end-fire antennas and to determine data regarding the object based on the fourth reflected signal; and
an electronic control unit (ECU) coupled to the first RFIC, the second RFIC, the third RFIC, and the fourth RFIC and configured to receive data regarding the object from at least two of the first RFIC, the second RFIC, the third RFIC, or the fourth RFIC and to determine three dimensional information regarding the object based on the received data.

14. A vehicular radar system comprising:
a first vehicular radar board having:
a printed circuit board (PCB) having a first planar surface, a second planar surface opposite the first planar surface, and a thickness from the first planar surface to the second planar surface,
a plurality of transmitter end-fire antennas positioned on the first planar surface of the PCB,
a first plurality of receiver end-fire antennas positioned on the first planar surface of the PCB and each being spaced apart by a first gap, a second plurality of receiver end-fire antennas positioned on the second planar surface of the PCB and each being spaced apart by a second gap that is greater than the first gap, a first radio frequency integrated circuit (RFIC) positioned on the first planar surface of the PCB, coupled to the plurality of transmitter end-fire antennas and the first plurality of receiver end-fire antennas, and configured to control the plurality of transmitter end-fire antennas to transmit radar signals having a wavelength and to receive a first reflected signal of the radar signals from the first plurality of receiver end-fire antennas that corresponds to an object such that the thickness of the PCB from the first planar surface to the second planar surface is greater than or equal to an amount that is half of the wavelength, and a second RFIC positioned on the second planar surface of the PCB, coupled to the second plurality of receiver end-fire antennas, and configured to receive a second reflected signal of the radar signals from the second plurality of receiver end-fire antennas that corresponds to the object;

a second vehicular radar board stacked above or below the first vehicular radar board and having similar features as the first vehicular radar board and being spaced from the first vehicular radar board by a distance that is greater than or equal to the amount that is at half of the wavelength; and an electronic control unit (ECU) coupled to the first vehicular radar board and the second vehicular radar board and configured to receive data regarding the object from the first vehicular radar board and the second vehicular radar board and to determine three dimensional information regarding the object based on the data received from the first vehicular radar board and the second vehicular radar board.

15. The vehicular radar system of claim 14 wherein:

the plurality of transmitter end-fire antennas, the first plurality of receiver end-fire antennas, and the second plurality of receiver end-fire antennas each have a transmission end that is oriented in a single direction;

the first RFIC is further configured to determine whether the object is present within a first distance of the first vehicular radar board and a first angle about the single direction of the first vehicular radar board based on the first reflected signal received from the first plurality of receiver end-fire antennas;

the second RFIC is further configured to determine whether the object is present within a second distance of the first vehicular radar board and a second angle about the single direction of the first vehicular radar board based on the second reflected signal received from the second plurality of receiver end-fire antennas;

the second distance is greater than the first distance; and the second angle is less than the first angle.

16. The vehicular radar system of claim 14 wherein the second plurality of receiver end-fire antennas includes a greater quantity of end-fire antennas than the first plurality of receiver end-fire antennas such that the second plurality of receiver end-fire antennas has a greater resolution than the first plurality of receiver end-fire antennas.

* * * * *